(12) United States Patent
Wu

(10) Patent No.: US 10,114,656 B2
(45) Date of Patent: Oct. 30, 2018

(54) ELECTRONIC DEVICE SUPPORTING DIFFERENT FIRMWARE FUNCTIONS AND OPERATION METHOD THEREOF

(71) Applicant: ASMedia Technology Inc., New Taipei (TW)

(72) Inventor: Chin-Lung Wu, New Taipei (TW)

(73) Assignee: ASMedia Technology Inc., New Taipei (TW)

( * ) Notice: Subject to any disclaimer, the term of this patent is extended or adjusted under 35 U.S.C. 154(b) by 101 days.

(21) Appl. No.: 15/470,913

(22) Filed: Mar. 28, 2017

(65) Prior Publication Data

US 2017/0293492 A1 Oct. 12, 2017

(30) Foreign Application Priority Data

Apr. 12, 2016 (TW) .............................. 105111295 A

(51) Int. Cl.
*G06F 9/24* (2006.01)
*G06F 15/177* (2006.01)
*G06F 9/4401* (2018.01)
*G06F 1/24* (2006.01)
*G06F 1/32* (2006.01)

(52) U.S. Cl.
CPC .............. *G06F 9/4406* (2013.01); *G06F 1/24* (2013.01); *G06F 1/3287* (2013.01); *G06F 9/4411* (2013.01); *G06F 9/4418* (2013.01)

(58) Field of Classification Search
None
See application file for complete search history.

(56) References Cited

U.S. PATENT DOCUMENTS 9,838,250 B1 * 12/2017 Ali .......................... G06F 8/654
2008/0126777 A1 * 5/2008 Chang ................. G06F 11/1417
713/2

FOREIGN PATENT DOCUMENTS

CN 100570389 12/2009
CN 102722389 10/2012

* cited by examiner

*Primary Examiner* — Nitin C Patel
(74) *Attorney, Agent, or Firm* — JCIPRNET

(57) ABSTRACT

An electronic device comprising a mainboard and a device is provided. The mainboard includes a first storage circuit, a CPU circuit and a data transmission interface circuit. The first storage circuit is configured to store a first firmware code of a basic input/output system, the CPU circuit is coupled to the first storage circuit, the CPU circuit is configured to execute the first firmware code to run the basic input/output system, and the data transmission interface circuit is coupled to the CPU circuit. The device is coupled to the data transmission interface circuit of the mainboard for providing a device function to the CPU circuit via the data transmission interface circuit. The device includes a controller, the controller includes a second storage circuit, a microcontroller and a suspend power register. An operation method of the electronic device is also provided.

10 Claims, 3 Drawing Sheets

ELECTRONIC DEVICE SUPPORTING DIFFERENT FIRMWARE FUNCTIONS AND OPERATION METHOD THEREOF

CROSS-REFERENCE TO RELATED APPLICATION

This application claims the priority benefit of Taiwan application serial No. 105111295, filed on Apr. 12, 2016. The entirety of the above-mentioned patent application is hereby incorporated by references herein and made a part of specification.

BACKGROUND OF THE INVENTION

Field of the Invention

The disclosure relates to an electronic device and an operation method and, more specifically, to an electronic device supporting different firmware functions and an operation method thereof.

Description of the Related Art

An interface card provides an electronic device with additional functions, and an option parameter is adjusted via a basic input/output system setup menu to change the functions provided by the interface card.

When the electronic device enters an operating system (OS) after power on self-test, the OS resets periphery devices. Therefore, after the electronic device is reset, a device driver for the interface card needs to restore to the previous option data to make the interface card firmware read the previous option data. Therefore, every time the device is reset, it is time consuming for the device driver for the interface card of the OS to restore to the previous option data again.

BRIEF SUMMARY OF THE INVENTION

According to an aspect of the disclosure, an electronic device comprises a mainboard and an equipment. The mainboard includes a first storage circuit, a CPU circuit and a data transmission interface circuit. The first storage circuit is configured to store a first firmware code of a basic input/output system. The CPU circuit is coupled to the first storage circuit. The CPU circuit is configured to execute the first firmware code to run the basic input/output system. The data transmission interface circuit is coupled to the CPU circuit. The equipment coupled to the data transmission interface circuit of the mainboard provides functions to the CPU circuit via the data transmission interface circuit. The device includes a controller. The controller includes a second storage circuit, a microcontroller and a suspend power register. The microcontroller is coupled to the second storage circuit and the suspend power register. The second storage circuit is configured to store a second firmware code of the device. The suspend power register is configured to store an option data of the second firmware code. The microcontroller executes the second firmware code to provide the device function to the CPU circuit according to the option data.

In sum, in embodiments, the electronic device and the operation method thereof uses the suspend power register to store the option data of the device. Different functions are supported by one single firmware by reading the option data stored in the suspend power register inside the device. The device does not need any additional external storage media to store the option data. When no main electric power is supplied (for example, in the suspend mode), the option data would not missed by using the suspend power register.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

The term "couple (or connect)" throughout the specification and the claim includes any direct or indirect connecting means. For example, if a first device coupled (or connected) to a second device is disclosed hereinafter, that means, the first device is directly coupled to the second device, or the first device is indirectly coupled to the second device via other devices or connecting means. Additionally, the same or similar reference number denotes the same or similar component/element/step throughout the embodiments and the figures. Descriptions of the component/element/step denoted by the same reference number can be cross-referenced.

Figure 1:
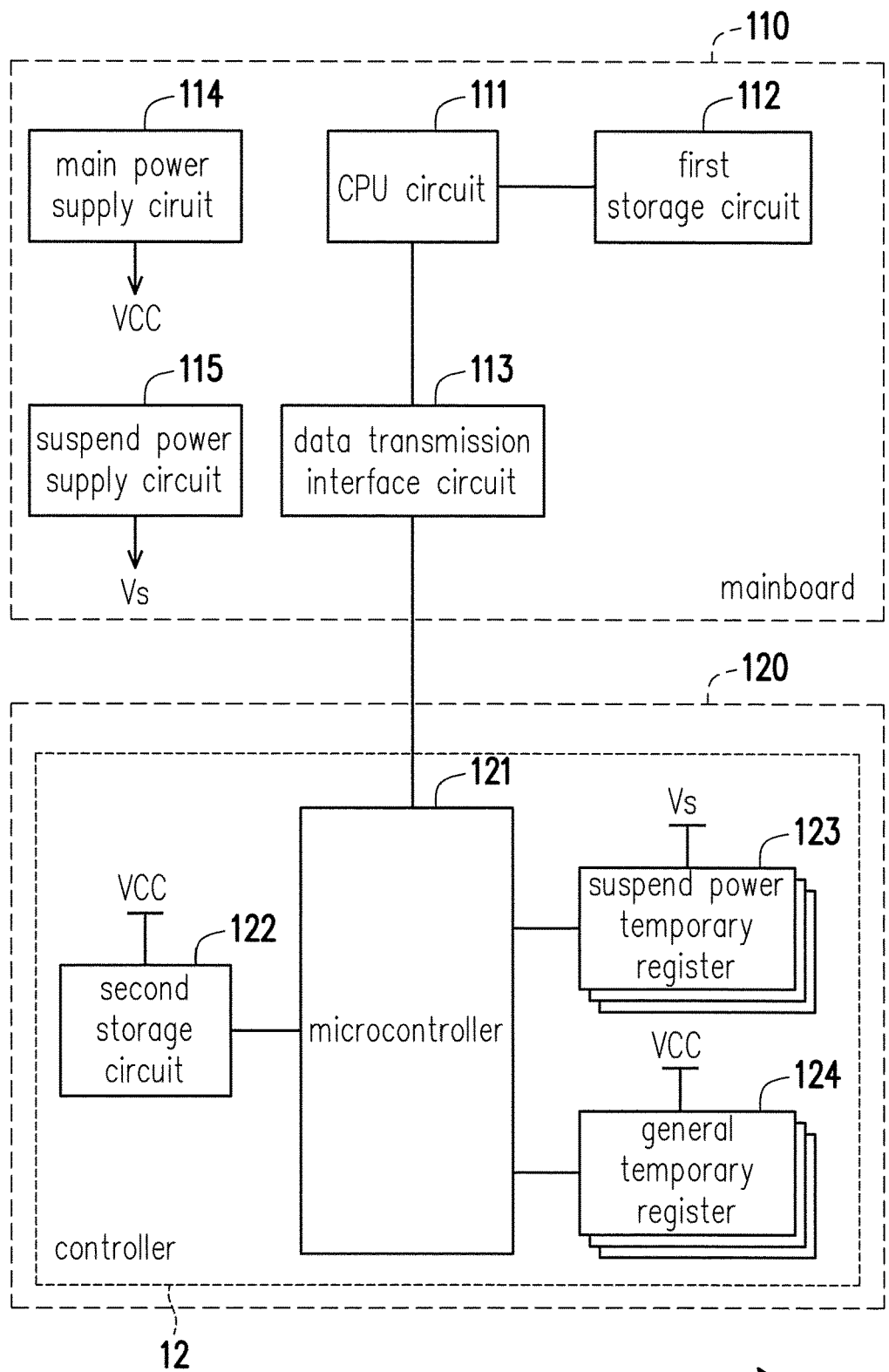
FIG. 1 is a block diagram showing a circuitry of an electronic device in an embodiment.

FIG. 1 is a block diagram showing a circuitry of an electronic device in an embodiment. An electronic device 100 includes a mainboard 110 and a equipment 120. The mainboard 110 includes a central processing unit (CPU) circuit 111, a first storage circuit 112 and a data transmission interface circuit 113. A firmware code of a basic input/output system (BIOS) is stored in the first storage circuit 112. The CPU circuit 111 is coupled to the first storage circuit 112. The CPU circuit 111 is configured to execute the firmware code of the BIOS to run the BIOS. The data transmission interface circuit 113 is coupled to the CPU circuit 111. In an embodiment, the data transmission interface circuit 113 includes a peripheral component interconnect express (PCIe) interface circuit or other communication interface circuits.

In the embodiment, the mainboard 110 further includes a main power supply circuit 114 and a suspend power supply circuit 115. The main power supply circuit 114 supplies a main electric power VCC to the units (such as the CPU circuit 111, the first storage circuit 112 and/or the data transmission interface circuit 113) of the mainboard 110. The main power supply circuit 114 further supplies the main electric power VCC to the equipment 120. When the electronic device 100 enters a suspend mode, the main power supply circuit 114 of the mainboard 110 stops supplying the main electric power VCC. When the electronic device 100 enters a normal mode from the suspend mode, the main power supply circuit 114 of the mainboard 110 restores the supply of the main electric power VCC.

The suspend power supply circuit 115 supplies a suspend electric power Vs to some units (such as the CPU circuit 111) of the mainboard 110 to keep running in the suspend mode. The suspend power supply circuit 115 further supplies the suspend electric power Vs to the equipment 120. No matter the electronic device 100 operates in the suspend mode or the normal mode, the suspend power supply circuit 115 of the mainboard 110 continuously supplies the suspend electric power Vs.

The equipment 120 is coupled to the data transmission interface circuit 113 of the mainboard 110. In an embodiment, the equipment 120 is an interface card (such as a display card) or other peripheral devices. The equipment 120 provides a device function to the CPU circuit 111 via the data transmission interface circuit 113. The equipment 120 includes a controller 12. In an embodiment, the controller 12 is an integrated circuit. The controller 12 includes a microcontroller 121 and a second storage circuit 122. In an embodiment, the second storage circuit 122 is a read-only memory (ROM).

The microcontroller 121 is coupled to the data transmission interface circuit 113 of the mainboard 110. The microcontroller 121 is further coupled to the second storage circuit 122. A firmware code of the equipment 120 is stored in the second storage circuit 122. The controller 12 further includes one or more suspend power registers 123 and one or more general temporary registers 124. The suspend power registers 123 are powered by the suspend power supply circuit 115 of the mainboard 110. The general temporary registers 124 are powered by the main power supply circuit 114 of the mainboard 110. The microcontroller 121 is coupled to the suspend power registers 123 and the general temporary registers 124. Temporary data of the running microcontroller 121 is stored in the general temporary registers 124. Option data of the firmware code of the equipment 120 is stored in the suspend power register 123. The microcontroller 121 executes the firmware code of the equipment 120 according to the option data of the suspend power register 123 to provide a specific device function to the CPU circuit 111.

Figure 2:
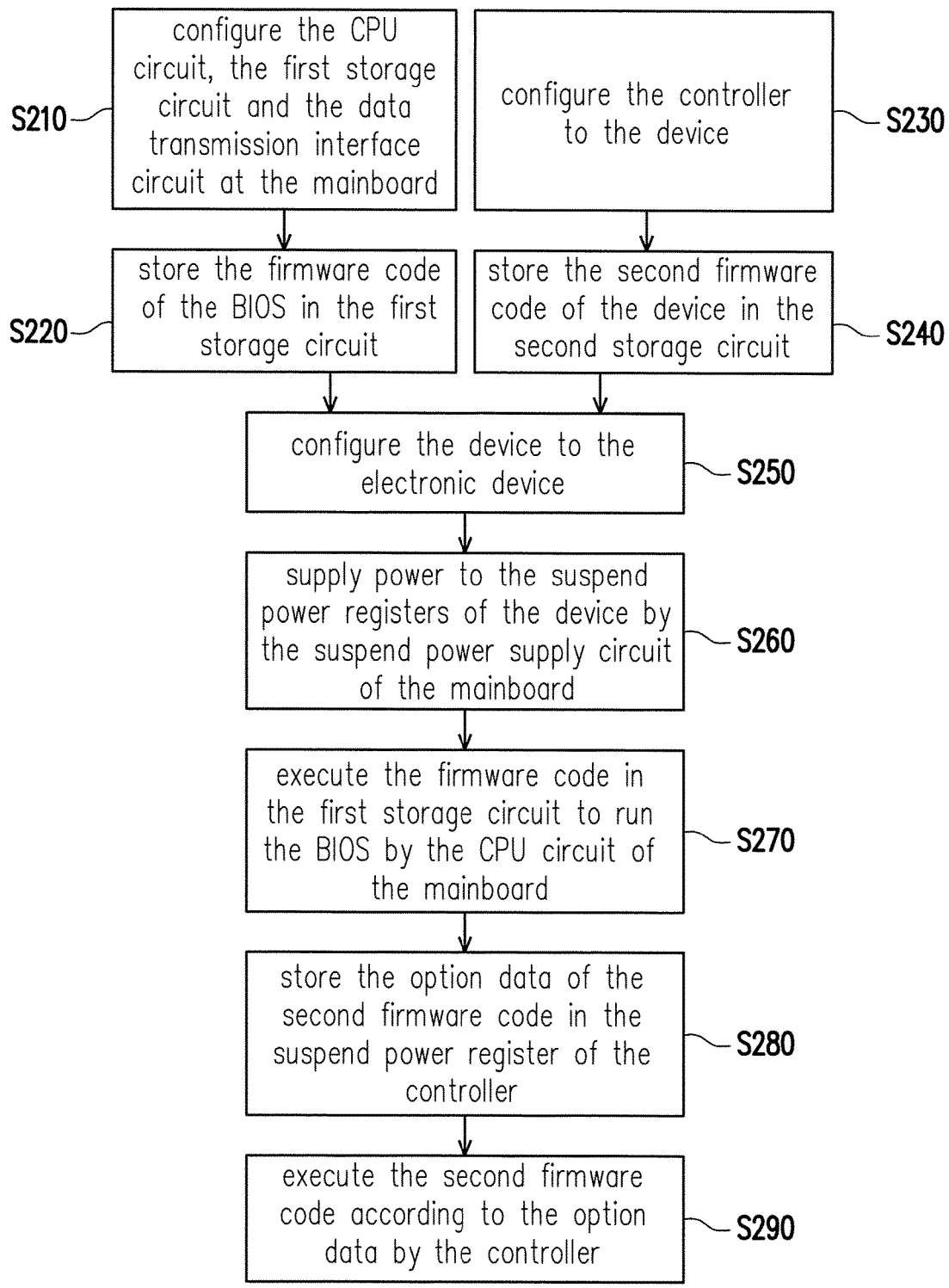
FIG. 2 is a flow chart of an operation method of an electronic device in an embodiment.

FIG. 2 is a flow chart of an operation method of an electronic device in an embodiment. Please refer to FIG. 1 and FIG. 2, in step S210, the CPU circuit 111, the first storage circuit 112 and the data transmission interface circuit 113 are configured at the mainboard 110. In step S220, the firmware code of the BIOS is stored in the first storage circuit 112. In step S230, the controller 12 is configured to the equipment 120. The controller 12 includes the microcontroller 121, the second storage circuit 122 and the suspend power register(s) 123. In step S240, the firmware code of the equipment 120 is stored in the second storage circuit 122. In step S250, the equipment 120 is configured to the electronic device 100. The equipment 120 is coupled to the data transmission interface circuit 113 of the mainboard 110 to provide a device function to the CPU circuit 111.

In step S260, the suspend power supply circuit 115 of the mainboard 110 supplies power to the suspend power register(s) 123, and the main power supply circuit 114 of the mainboard 110 supplies power to the microcontroller 121, the second storage circuit 122 and the general temporary register(s) 124. The main power supply circuit 114 further supplies power to the CPU circuit 111, the first storage circuit 112 and the data transmission interface circuit 113 of the mainboard 110. In step S270, the CPU circuit 111 of the mainboard 110 executes the firmware code in the first storage circuit 112 to run the BIOS. An option parameter in the BIOS setup menu is adjusted to change the different functions of the mainboard 110, and/or the different functions of the device connected to the mainboard 110.

In step S280, the option data of the firmware code of the equipment 120 is stored in the suspend power register 123 of the controller 12 by the BIOS of the mainboard 110. When the option parameter associated with the equipment 120 in the BIOS setup menu is changed, the corresponding option data is set into the corresponding suspend power register 123 of the controller 12 by the BIOS of the mainboard 110 according to the option parameter in the BIOS setup menu. In step S290, the microcontroller 121 of the controller 12 executes the firmware code of the equipment 120 according to the option data of the suspend power register 123 to provide the corresponding device function to the CPU circuit 111.

In the embodiment, the suspend power register(s) 123 is used for storing the option data of the equipment 120. One single firmware of the equipment 120 can support different functions by reading the option data stored in the suspend power register 123 of the equipment 120. Therefore, the device does not need any additional external storage media to store the option data. In the embodiment, when no main electric power is supplied in the electronic device 100 (for example, the electronic device enters the suspend mode), the option data of the equipment 120 would not be missed by using the suspend power register 123. After the main power supply circuit 114 restores the supply of the power, the device driver of the operating system (OS) does not need to restore to the previous option data back to the suspend power register 123.

Figure 3:
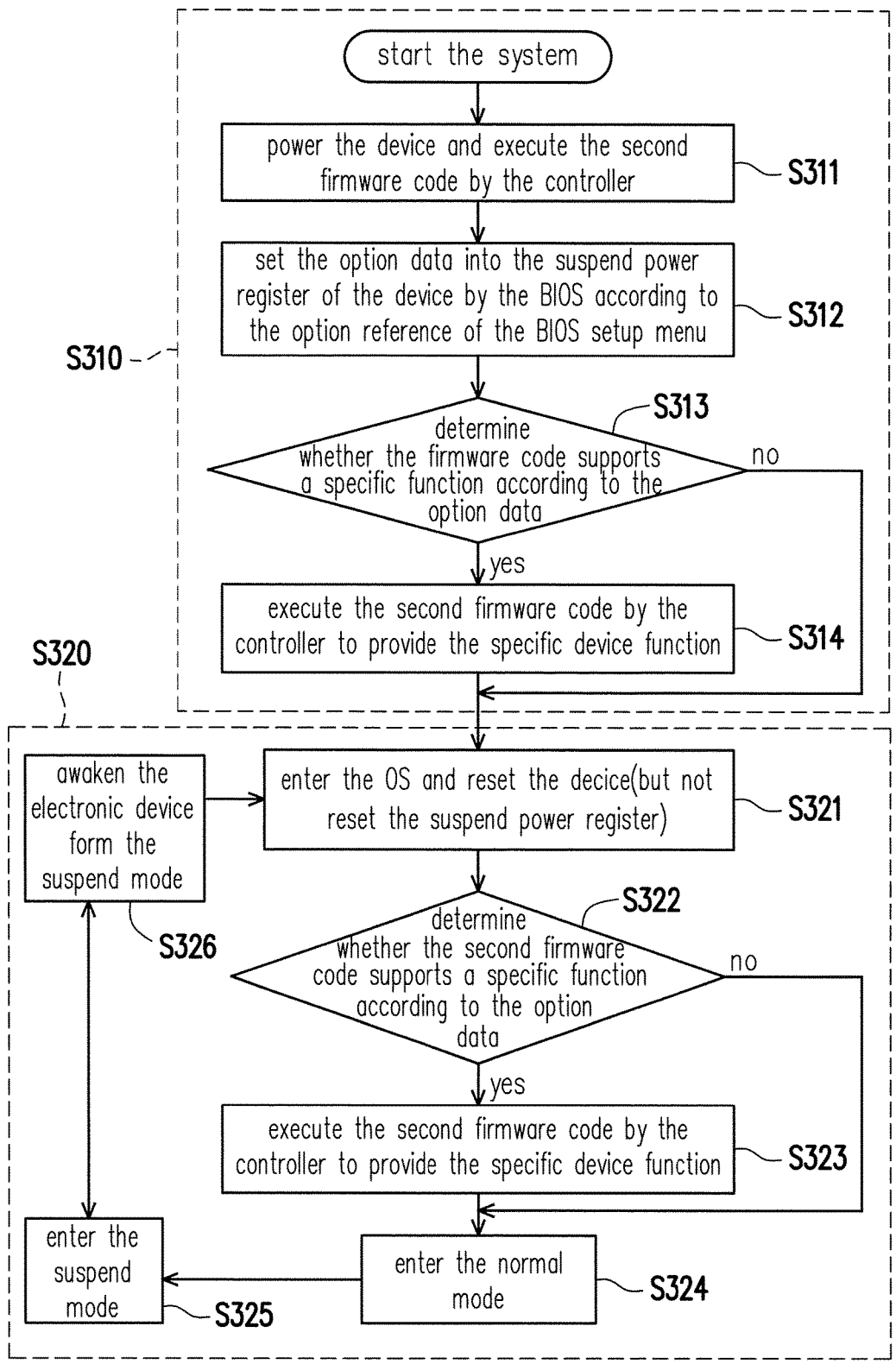
FIG. 3 is a flow chart of an operation method of an electronic device in an embodiment.

FIG. 3 is a flow chart of an operation method of an electronic device in an embodiment. Please refer to FIG. 1 and FIG. 3, in step S310, the BIOS of the electronic device 100 starts to run initialization, such as a power on self-test (POST). After the initialization of the BIOS, the electronic device 100 performs step S320 to run the OS.

Step S310 of FIG. 3 includes sub-steps S311~S314. In step S311, the main power supply circuit 114 of the mainboard 110 supplies power to the units of the mainboard 110, such as the CPU circuit 111, the first storage circuit 112 and the data transmission interface circuit 113. In step S311, the main power supply circuit 114 of the mainboard 110 further supplies power to the equipment 120. For example, the main power supply circuit 114 supplies power to the microcontroller 121, the second storage circuit 122 and the general temporary register 124 of the controller 12. The suspend power supply circuit 115 supplies power to the suspend power registers 123 of the controller 12. Thus, the microcontroller 121 of the controller 12 executes the firmware code of the equipment 120.

In step S312, during the initialization of the electronic device 100, the corresponding option data are set into the suspend power register 123 of the equipment 120 via the data transmission interface circuit 113 by the BIOS of the mainboard 110 according to the option parameter of the BIOS setup menu. Details for the step S312 of FIG. 3 can refer to the description of the step S280 of FIG. 2, and/or the step S280 of FIG. 2 can refer to the description of the step S312, which is not described herein.

In step S313, the microcontroller 121 of the controller 12 determines whether the firmware code of the equipment 120 supports a corresponding function according to the option data of the suspend power register 123 of the controller 12. If the firmware code of the equipment 120 does not support a specific function corresponding to the option data, then, step S314 is not performed. If the firmware code of the equipment 120 supports the specific function corresponding to the option data, then, step S314 is performed by the microcontroller 121 of the controller 12. In step S314, the microcontroller 121 of the controller 12 executes the firmware code of the equipment 120 according to the option data of the suspend power register 123 of the controller 12 to provide the corresponding device function to the CPU circuit 111. Details for the step S314 of FIG. 3 can refer to the description of step S290 of FIG. 2, and/or the step S290 of FIG. 2 can refer to the description of the step S313 and step S314 in FIG. 3, which is not described herein.

Step S320 of FIG. 3 includes sub-steps S321~S326. After the POST of the electronic device 100 is completed, the electronic device 100 enters the OS (in step S321). When the electronic device enters the OS, in step S321, the OS resets the peripheral devices which include the equipment 120 of FIG. 1. When the equipment 120 is reset, the microcontroller 121 and the general temporary registers 124 of the controller 12 are reset, however, the suspend power registers 123 of the controller 12 are not reset. In an embodiment, the OS sends a resetting command to the equipment 120. The resetting command is executed by the microcontroller 121 of the controller 12 to re-enable of the firmware code of the equipment 120 and to reset the general temporary registers 124 of the controller 12, but not to reset the suspend power registers 123 of the controller 12. Therefore, the option data set in the step S312 would not missed by using the suspend power registers 123, and the previous option data does not need to be restored back to the suspend power registers 123 of the controller 12 by the device driver of the OS. After the microcontroller 121 of the controller 12 is reset, the microcontroller 121 reads the firmware code of the second storage circuit 122 to re-run the firmware of the equipment 120.

In step S322, the microcontroller 121 of the controller 12 determines whether the firmware code of the equipment 120 supports a corresponding specific function according to the option data of the suspend power register 123 of the controller 12. If the firmware code of the equipment 120 does not support the specific function corresponding to the option data, then, step S323 is not performed. If the firmware code of the equipment 120 supports the specific function corresponding to the option data, then, step S323 is performed by the microcontroller 121 of the controller 12. In step S323, the microcontroller 121 of the controller 12 executes the firmware code of the equipment 120 according to the option data of the suspend power register 123 to provide the corresponding device function to the CPU circuit 111. Details for the step S323 of FIG. 3 can refer to the descriptions of step S290 of FIG. 2 or step S314 of FIG. 3, and/or the step S290 of FIG. 2 can refer to the description of the step S322 and step S323 in FIG. 3, which is not described herein.

In step S324, the CPU circuit 111 of the mainboard 110 and the microcontroller 121 of the controller 12 of the equipment 120 are in the normal mode, until the electronic device 100 enters the suspend mode. In step S325, the CPU circuit 111 of the mainboard 110 and the microcontroller 121 of the controller 12 enters the suspend mode. When the electronic device 100 enters the suspend mode, the main power supply circuit 114 of the mainboard 110 stops supplying the main electric power VCC, and the suspend power supply circuit 115 of the mainboard 110 continues to supply the suspend electric power Vs. Therefore, when the electronic device 100 enters the suspend mode, the option data of equipment 120 set in the step S312 would not missed by using the suspend power register 123 of the controller 12.

In step S326, when the electronic device 100 is awakened form the suspend mode, the main power supply circuit 114 of the mainboard 110 restores the supply of the main electric power VCC. After the OS of the electronic device 100 is awakened, the OS resets the periphery devices which include the equipment 120 of FIG. 1 (in step S321). When the equipment 120 is reset, the microcontroller 121 and the general temporary registers 124 of the controller 12 are reset, but the suspend power registers 123 of the controller 12 are not reset. Therefore, the device driver of the OS does not need to restore to the previous option data back to the suspend power register 123 of the controller 12. When the microcontroller 121 of the controller 12 is reset, the microcontroller 121 runs the firmware of the equipment 120 and performs the steps S322-S324 again.

In an embodiment, the microcontroller 121, the second storage circuit 122, the suspend power registers 123 and the general temporary registers 124 of the controller 12 of FIG. 1 are integrated into one single chip. In embodiments, in different applications, functions of the microcontroller 121, the second storage circuit 122, the suspend power registers 123 and/or the general temporary registers 124 are implemented by firmware or hardware via a hardware description language (such as Verilog HDL and VHDL) or other suitable programming languages. In an embodiment, the firmware for certain functions is configured in any computer-accessible media, such as magnetic tapes, semiconductors, memories, magnetic disks and compact disks (such as CD-ROM and DVD-ROM). In an embodiment, the firmware is delivered via Internet, wired communication, wireless communication or other communication media. In an embodiment, the firmware is stored in a computer-accessible medium to facilitate the processor of the computer to access/execute programming codes of the firmware. In an embodiment, the electronic device and the method thereof are implemented via a combination of hardwares and softwares.

In sum, in the embodiments of the electronic device 100 and the operation method thereof, the option data of the equipment 120 is stored in the suspend power register 123 of the chip. By reading option data for different functions, the equipment 120 (such as an interface card) can support multiple functions with one single firmware. The equipment 120 does not need any additional external storage media to store the option data, which saves the cost. When no main electric power is supplied (for example, the electronic device is in the suspend mode), or when the equipment 120 is reset, the option data of the suspend power register 123 would not be cleared. The BIOS only needs to set the option data into the suspend power register 123 when the electronic device 100 is powered on for the first time. When the suspend mode ends, or after the equipment 120 is reset, the OS does not need to restore the option data back to the suspend power register 123. The firmware of the equipment 120 can read the right option data to support a certain function.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. An electronic device comprising:
   a mainboard including a first storage circuit, a CPU circuit and a data transmission interface circuit, wherein the first storage circuit is configured to store a first firmware code of a basic input/output system, the CPU circuit is coupled to the first storage circuit, the CPU circuit is configured to execute the first firmware code to run the basic input/output system, and the data transmission interface circuit is coupled to the CPU circuit; and
   an equipment coupled to the data transmission interface circuit of the mainboard and providing functions to the CPU circuit via the data transmission interface circuit, wherein the equipment includes a controller, the controller includes a second storage circuit, a microcontroller and a suspend power register, the microcontroller is coupled to the second storage circuit and the suspend power register, the second storage circuit is configured to store a second firmware code of the device, the suspend power register is configured to store an option data of the second firmware code, and the microcontroller executes the second firmware code to provide the device function to the CPU circuit according to the option data.

2. The electronic device according to claim 1, wherein the suspend power register is powered by a suspend power supply circuit of the mainboard.

3. The electronic device according to claim 1, wherein during an initialization of the electronic device, the basic input/output system sets the option data in the suspend power register of the device correspondingly via the data transmission interface circuit according to an option reference of a basic input/output system setup menu.

4. The electronic device according to claim 1, the device further comprising:
a general temporary register coupled to the microcontroller and powered by a main power supply circuit of the mainboard;
wherein when the electronic device enters an operating system, the operating system sends a resetting command to the device, and the microcontroller executes the resetting command to re-enable the second firmware code and to reset the general temporary register.

5. The electronic device according to claim 4, wherein when the operating system sends the resetting command to the device, the suspend power register is not reset.

6. An operation method of an electronic device, the electronic device comprises a CPU circuit, a first storage circuit, a suspend power supply circuit and a data transmission interface circuit coupled to an equipment, the equipment comprises a second storage circuit, a microcontroller and a suspend power register, the operation method comprising:

storing a first firmware code of a basic input/output system into the first storage circuit and executing the first firmware code to run the basic input/output system via the CPU circuit;
storing a second firmware code of the device into the second storage circuit;
storing an option data of the second firmware code into the suspend power register; and
executing the second firmware code according to the option data via the microcontroller to provide a device function to the CPU circuit.

7. The operation method of the electronic device according to claim 6, the method further comprising:
during an initialization, the basic input/output system of the electronic device sets the option data into the suspend power register of the device correspondingly via the data transmission interface circuit according to an option reference of a basic input/output system setup menu.

8. The operation method of the electronic device according to claim 6, the method further comprising:
when the electronic device enters an operating system, the operating system sends a resetting command to the device; and
the microcontroller executes the resetting command to re-enable the second firmware code.

9. The operation method of the electronic device according to claim 6, the method further comprising:
when the electronic device enters an operating system, the operating system sends a resetting command to the device; and
the microcontroller executes the resetting command to re-enable the second firmware code and to reset the general temporary register.

10. The operation method of the electronic device according to claim 9, wherein when the microcontroller executes the resetting command to reset the device and to re-enable the second firmware code, the suspend power register is not reset.

* * * * *